F. B. MARCHANT.
LENS GROOVING MACHINE.
APPLICATION FILED AUG. 28, 1915.
1,254,253.
Patented Jan. 22, 1918.
3 SHEETS—SHEET 1.
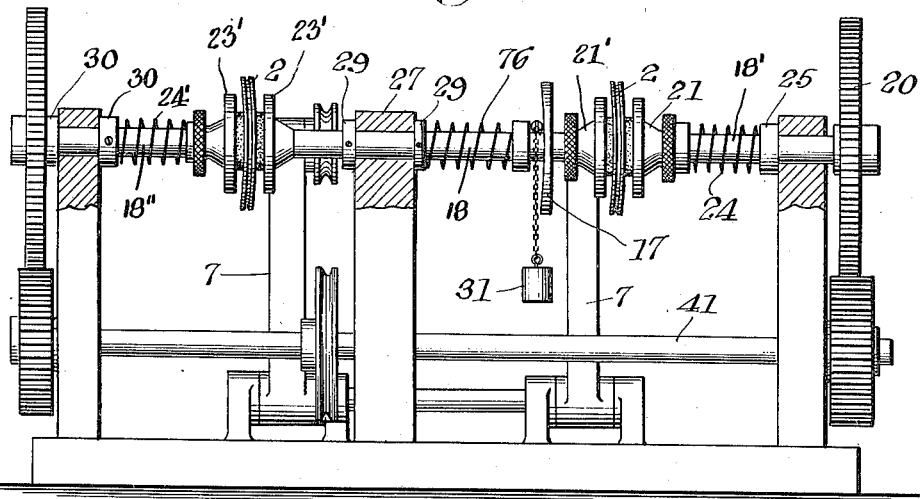
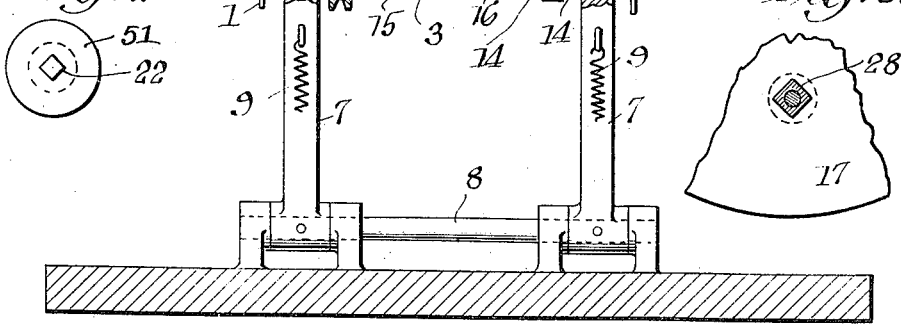
INVENTOR
Frank B. Marchant
BY
Townsend & Decker
ATTORNEYS

F. B. MARCHANT.
LENS GROOVING MACHINE.
APPLICATION FILED AUG. 28, 1915.

1,254,253.

Patented Jan. 22, 1918.
3 SHEETS—SHEET 2.

INVENTOR
Frank B. Marchant.
BY
Townsend & Decker
ATTORNEYS

F. B. MARCHANT.
LENS GROOVING MACHINE.
APPLICATION FILED AUG. 28, 1915.
1,254,253.
Patented Jan. 22, 1918.
3 SHEETS—SHEET 3.
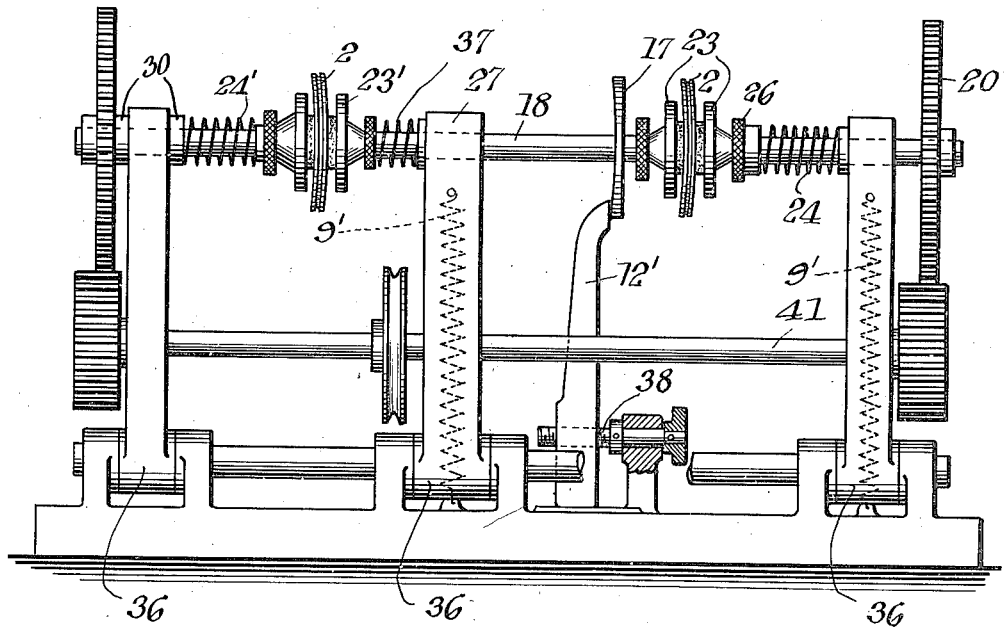
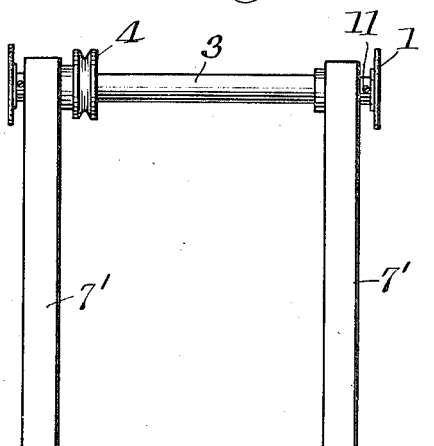
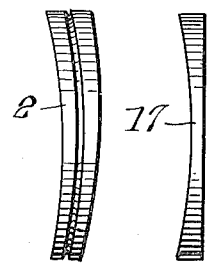
INVENTOR
Frank B. Marchant.
BY
Townsend Decker
ATTORNEYS

UNITED STATES PATENT OFFICE.

FRANK B. MARCHANT, OF BROOKLYN, NEW YORK.

LENS-GROOVING MACHINE.

1,254,253.   Specification of Letters Patent.   Patented Jan. 22, 1918.

Application filed August 28, 1915. Serial No. 47,876.

*To all whom it may concern:*

Be it known that I, FRANK B. MARCHANT, a citizen of the United States, and a resident of Brooklyn, in the county of Kings and State of New York, have invented certain new and useful Improvements in Lens-Grooving Machines, of which the following is a specification.

My invention relates to a machine for cutting a narrow or fine groove in the edge of lenses of finished peripheral contour for spectacles, eyeglasses or similar articles, such groove being adapted to receive and hold a fine wire, so fine as to be practically invisible if desired, and used as a part of the mounting of the spectacle or eyeglass for supporting said lens.

The object of my invention is to provide a machine whereby the said groove may be accurately cut and its position with regard to one or both faces of the lens accurately and automatically determined and preserved during the operation of the machine in cutting said groove.

By the use of my invention a groove may be cut in the edge of a lens of any form, which groove shall be at a uniform distance around the whole periphery of the lens from either or both faces thereof when the edge of the lens is of uniform thickness all the way around or it may be at a uniform distance all the way around from one face thereof and without regard to the form or shape of the opposite face or, in case of lenses whose thickness at the periphery varies, may describe a medial line between the faces all the way around or, in other words, may be at the same distance from both faces at every point of the periphery or edge of the lens.

My invention in fact permits the groove to be located on the edge at any position with respect to the face or faces of a lens of any form as will be apparent from the subjoined description of the machine and its manner of operation.

A machine constructed according to my invention is practically entirely automatic in its operation after the lens or lenses have been mounted in their chucks and, the necessary preliminary adjustment having been made, the machine has been started into operation.

My invention further permits a multiplicity of lenses to be grooved at the same time.

In the accompanying drawings, Figure 1 is an end elevation of a machine constructed in accordance with my invention.

Fig. 2 is an end elevation of the cutter shaft and supporting frame therefor, part being shown in section.

Fig. 5 is a vertical longitudinal section through a portion of the machine in which the lens at one end of the machine is mounted.

Fig. 6 is a similar section through the portion of the machine provided with the lens-holding chuck and pattern.

Fig. 7 shows in end view a section of the shaft which terminates in a lens-holding chuck.

Fig. 8 is a vertical section through a portion of the shaft in which the pattern and clamp therefor are located.

Fig. 9 is an end elevation of a modified form of machine embodying my invention.

Fig. 10 is an end elevation of the portion of said machine containing the cutters and the mounting therefor.

Fig. 11 shows in vertical section the end of the cutter shaft and the manner of fixing the cutter therein.

Fig. 12 shows in edge view a form of lens which varies in thickness at its edge and has a groove cut therein on a medial line between the faces of the lens all the way around by the use of the pattern whose operative surface is shown in Fig. 13.

In the various figures 1 indicates a carborundum or emery wheel having a thin edge adapted to cut a groove of the required fineness in the edge of the lens which latter is in each case designated by the numeral 2. The lens by means to be presently described is rotated on its own axis but at a slower speed while engaged at its edge by the rotary cutter.

Figure 3:
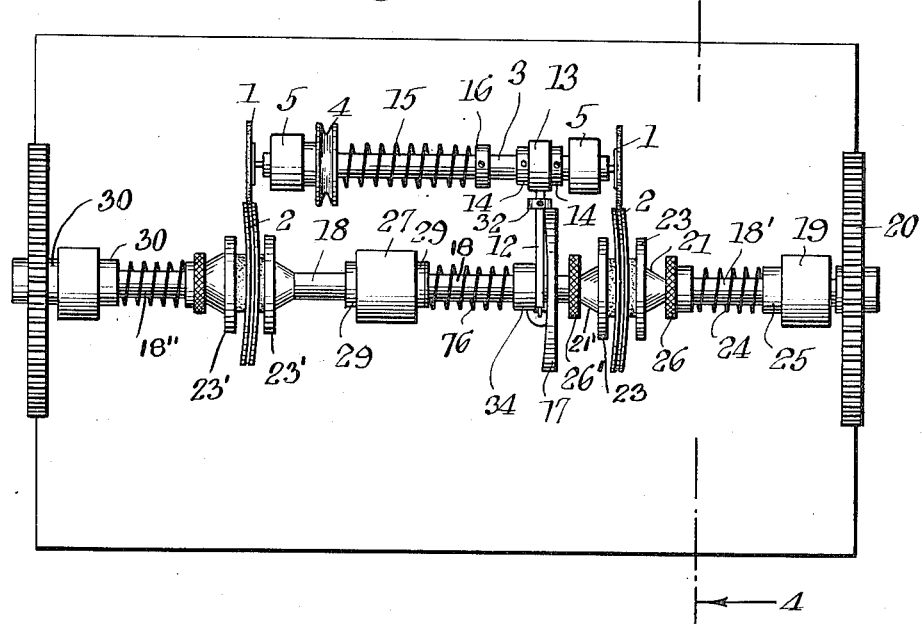
Fig. 3 is a plan of the machine.

3 is the cutter shaft to which the cutter or cutters 1 are fixed in such manner that the cutters may be driven or rotated at considerable speed by power applied thereto through the pulley 4 suitably connected to said shaft for said purpose. Said cutter shaft in the form of my invention illustrated in Figs. 1, 2 and 3 is likewise capable of axial movement or adjustment in the bearings 5 and so that said cutters may be caused to move positively in an axial direction by any movement communicated to the said shaft. In order that the said shaft may be moved axially without interference from or with the drive pulley 4, the said pulley is connected to the shaft by means of a longitudinal spline or key 6 on the shaft engaging in a key-way or slot in the hub of the pulley in a manner clearly shown in Fig. 2.

Figures 4, 14, 15, 16:
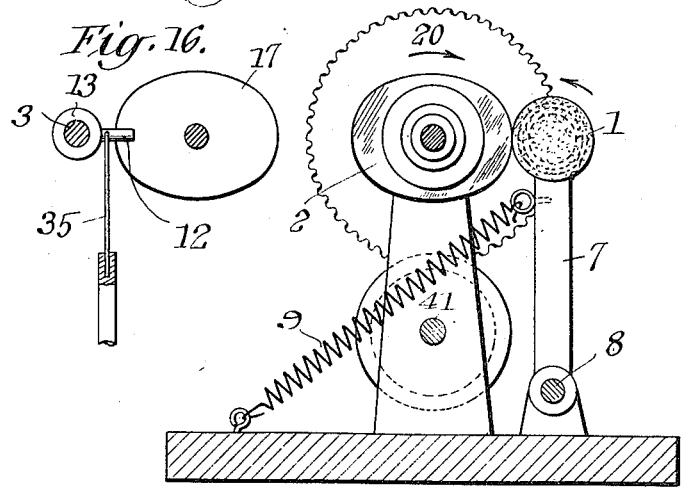
Fig. 4 is a vertical section on the line 4, 4 Fig. 3.
Fig. 14 shows in detail the preferred construction of stop for primarily regulating and determining the depth of the cut and Fig. 15 shows a face view of the stop and attachment used in this adjustment.
Fig. 16 shows a modification in the manner of supporting the gage arm.

It is preferable to mount the bearings 5 for the shaft in the arms or uprights 7 of a frame which may rock on a rock shaft 8 mounted on the base of the machine in order that the cutters may be kept in proper engagement with the edge of the lens all the way around the periphery thereof and by the yielding influence preferably of springs 9 as clearly shown in Figs. 2 and 4. Instead, however, of mounting the cutter shaft so as to be movable backward and forward the frame thereof may be fixed as illustrated in Fig. 10 and the frame or support for the lenses may be made to move under the action of a spring during the operation of grooving the lens to keep the edge thereof engaged with the cutting edge of the cutter as will be presently described.

The cutters are fixed to the shaft by any desired means, as for instance by means illustrated in Fig. 11 where the stem 10 of the cutting wheel is shown located in a bore entering the end of the shaft and fastened in said bore by the set screw 11, this being a well known expedient and usual method of fastening the cutter to the shaft by which it is rotated. Axial adjustment or movement of the shaft and cutter carried thereby, whereby said cutter may be kept engaged with the edge of the lens at the desired points between the faces and all the way around the periphery thereof during the cutting operation by the automatic adjustment of said shaft axially, is effected by the gage or gage arm 12 carried by a sleeve 13 loose on the shaft but held immovably with relation to the shaft in an axial direction by means of the two collars 14 fixed on said shaft and embracing the sleeve 13 between them or by other mechanical devices whereby the axial movement of the shaft must follow positively in either direction any movement of the gage arm in a direction parallel to said axis.

In the preferred construction of machine embodying my invention I employ also in connection with said shaft 3 a spring 15 which tends to move the shaft axially by bearing at one end against the collar 16 fast on the shaft and confined at its opposite end by engagement with the pulley 4 which, as shown, is seated by its hub against the fixed bearing 5 so that, as will be obvious, by the expansive effect of the spring the shaft 3 may be caused to move axially to the right but under the restraint and control of the gage arm 12, movement of the shaft in the opposite direction being in this instance produced against the effect of the spring by the positive connection of said gage arm with the shaft, as already described.

As will be seen, no movement of the cutter axially can take place or be produced excepting in correspondence with the movements of the gage arm 12 in an axial direction.

My invention does not depend upon the use of any particular mechanical devices for fixing the cutter to the cutter shaft or for operating the same axially by a positive connection of the gage arm with said shaft for axial movement in both directions. The gage 12, which for convenience of description only is termed the gage arm, produces or controls the desired axial movement of the shaft 3 and cutter by sidewise engagement with a surface on a part which rotates synchronously with the lens and has a surface at the point of engagement varying in form with respect to the required position of the groove at the edge of the lens in its relation to the faces thereof at the consecutive points of the groove following the periphery of said lens. When the lens is of uniform width it is obvious that one surface thereof near the edge affords a proper surface for engagement by the gage arm if the same be provided with means for keeping it so engaged, as for instance means comprising the spring 15 or a supplemental or additional spring 76 upon the lens-carrying shaft, as will be presently described. Ordinarily, however, it is preferable to use a pattern 17 substantially the same in its peripheral outline with the lens to be grooved and conforming on one of its surfaces near its edge with the form of the line of cut required to be made in the particular lens under operation. Said pattern is mounted co-axially with the lens and in the operation of cutting, said pattern is rotated synchronously with the lens being grooved.

In Fig. 3 of the drawings, the pattern, so termed for convenience of description, (although as will be readily understood in a functional sense one face of the lens itself may serve the function of the said pattern) is shown formed for cutting a groove in an edge of a concavo-convex lens. In order that the groove may be at a uniform distance from one or both faces of the lens all the way around the periphery thereof an axial adjustment of the cutter and the lens with respect to one another will be required during the operation of completing the groove all the way around the edge. This axial adjustment is secured, in the form of my invention shown in Fig. 1, by moving the cutter shaft axially in obedience to the to and fro movement of the gage positively connected with the shaft and as influenced and controlled by the form of surface against which the gage is constantly pressed.

When the edge of the lens is of uniform thickness the gage arm or device may bear against the face of the lens itself and the line of the groove will be at a uniform distance all the way around from both faces of the lens; but where the lens varies in thickness around its periphery it is desirable to employ a pattern whose surface, where engaged by the gage arm, varies as the distance of the groove must vary from a face of the lens in order that the groove may be on a medial line between the two faces all the way around the edge. The use of a pattern conforming to the line of the groove desired in the edge of the lens and rotating synchronously with said lens is a preferable construction for other reasons also and as will be also obvious, said pattern might be used even when the lens is of uniform thickness all the way around its edge. In this case likewise the pattern would follow on its gaging surface the line to be described by the cutter in cutting the groove in the desired position on the edge of the lens.

During the operation of cutting the groove the lens is rotated, but at less speed than the cutter, by attachment to a shaft 18, as will be presently described, the relative direction of rotation of the cutter and lens respectively being preferably such as indicated by the arrows Fig. 4. By a proper conformation of the operating or adjusting surface on the pattern 17 it is obvious that the groove may be caused to describe any desired line with relation to the surfaces of the lens, that is to say a groove which will be the same distance from one surface all the way around or will vary in its distance therefrom progressively or otherwise around the peripheral edge. Further, it will be obvious that the groove may be located nearer one surface than the other at said edge and may maintain a uniform distance or not, as desired, from each surface all the way around. As shown, the groove is cut on a medial line between the two surfaces of a lens which is of uniform thickness at its edge all the way around but it is sometimes required to groove lenses which are thicker at one portion of the edge than at the other, as indicated in Fig. 12, and in such case it may be required or desirable that the groove describe a medial line between the surfaces all the way around the edge. In this case the pattern for doing the work would have, as indicated in Fig. 3, a surface on the line against which the gage arm presses, that would answer to the changing position required of the groove with respect to the opposite surfaces of the lens in order that it may be located in the same relative position with respect to the surfaces all the way around the edge.

The lens-carrying shaft 18 is preferably made in sections to allow the convenient insertion and substitution of lenses and pattern in chucks or heads carried by said shaft, and with the axis of the lens and pattern coinciding substantially with the axis of rotation. For this purpose the said rotary lens-carrying member of the machine may be constructed in the following or any other desired manner.

At the right-hand end of the machine, as shown in Fig. 3, the section 18' of said shaft turns in a suitable fixed bearing 19 and carries at the outside of said bearing a drive wheel 20 consisting, if desired, of a gear wheel meshing with the gear on the drive shaft 41, as seen in Fig. 1. Section 18' at the inside of the bearing 19 terminates in the head 21 the face 51 of which, as indicated in Fig. 6 and Fig. 7, has a square or other suitably formed projection 22 adapted to enter a similar opening in one of two clamp plates 23 each having a rubber or other suitable facing and adapted to clamp the lens between them for the purpose of rotating said lens by the rotation of the shaft, to which the plates 23 of the clutch or chuck are coupled by means of the keys or projections 22. A head 21' similar to 21 is carried by the intermediate section of the lens-operating shaft and is coupled to the corresponding clamp plate 23 in a similar manner. Spring pressure of the clutch upon the lens may be produced by the action of the spring 24 confined between the head 21 and a loose collar 25 on said shaft engaging the bearing 19. By means of the thumb piece 26 said section of shaft may be moved back axially against the force of the spring to disengage the lens and allow the substitution of a new one, the section 18' of said shaft being capable of axial movement in the bearing 19 and the drive gear on the end of shaft 21 being of sufficient width to maintain its mesh with gear 20 in such backward axial movement or adjustment.

The intermediate or main section 18 of the lens-carrying shaft when provided with clamping means for securing the pattern 17 to it is suitably mounted in its bearing 27 so as to be incapable of any axial movement, or is otherwise held against movement which would permit any axial movement of the pattern 17 secured thereto during the turning movement of said pattern. Such axial movement of the shaft may be prevented by means of the collars 29 fixed thereto and set up against the ends of the bearing 27.

To allow the removal and insertion of different patterns for different lenses being grooved, said pattern is detachably secured to the shaft by any suitable means which will center it properly thereon and will cause it to turn in synchronism with the shaft and lens. For this purpose it may be clamped as shown in Fig. 6 between the section carrying head 21' and the end of shaft 18 by providing said section with a threaded projection adapted to enter an opening tapped in the end of the shaft 18. The end of said shaft is preferably made square, as indicated at 28 in Fig. 8, and the center of the pattern is formed with a similar square opening fitting thereon so as to properly center the pattern and also turn the same by the positive action of the shaft.

The shaft 18 may be also provided, as shown at the left of the Figs. 1 and 3, with one or more additional lens-holding chucks adapted to coöperate with one or more additional rotary cutters 1. The chuck or clutch at the left may be identical with that already described as to the mounting of its parts on the section of the shaft carrying the same, although in the present instance I have shown the construction modified by making the head which carries one of the clutch plates 23' slidable axially on the left-hand section 18' of the shaft, the head being in this instance operatively connected with said section by a groove and spline in obvious manner. In this instance the section 18' is held against axial movement in its bearing by collars 30 fixed to said section of shaft, while the head is spring pressed axially to clamp the lens by the operation of the spring 24' inserted between the head and the collar 30. The left-hand section of shaft may be also driven by gear from the shaft 41, if desired, and as shown. The opposite clutch plate 23' is secured to the section 18 of the shaft.

As will be seen, the pattern 17 and the one or more lenses on the same shaft therewith or rotating co-axially therewith will all be caused to rotate in synchronism. The clamps described for the lenses obviously permit the adjustment of the lens so that its outline shall coincide with the outline or gage-operating surface of the pattern.

The gage arm may be held against dropping down out of proper position by providing it with an extension resting upon the lens-carrying shaft, as shown, or other proper support, and upward movement of said arm which would tend to disturb its proper synchronous relation to the surface of the pattern engaged thereby may be prevented by the use of a weight 31 or other restraining influence applied to the arm as shown.

When the two elements or members of the machine are spring pressed toward one another, as described, to keep the edge of the cutter constantly engaged with the edge of the lens at the changing line of the periphery thereof, difficulty would be experienced (unless other appliances were employed) in securing a uniform depth of cut of the groove owing to difference in hardness of the material of the lens or of the cutter even though the speed of rotation of the lens and cutter is exactly maintained. To obviate this difficulty I employ a stop device properly located and arranged to act at all stages of the cutting operation around the whole periphery of the lens so as to limit the approach of the cutter and lens at all such stages and to insure a uniform depth of cut. To attain this end I provide the stop 32 mounted on one of the members of the machine, as for instance that carrying the cutter and adapted to engage during the swinging movement of the cutter-carrying frame with the edge of the lens or with that of a pattern having a similar contour. For convenience of attachment and adjustment for lenses of different size said stop may be adjustably mounted upon the gage arm and adapted to be moved to and fro thereon in relation to the edge of the lens or pattern as shown. When thus made adjustable, the machine may be used for grooving different sizes of lens without changing the size of the pattern. When fixed in position by means of its set screw, it is obvious that said stop will limit the approach of the lens-carrying and cutter-carrying frames to one another in all positions of the yielding or swinging member and that the depth of cut in the edge of the lens at opposite edges both on the long and short axis thereof will be the same, the depth being determined primarily by the adjusted position of the stop.

To exactly predetermine the depth of cut I employ a suitable shim or insert 33 of a thickness the same as the depth of cut, which is mounted on the stop and may be inserted between the stop and the edge of the pattern or lens and which may be withdrawn after the stop has been brought up against the insert to firmly press the same between the stop and the edge of the pattern. After the machine has been started it is obvious that the depth of cut will be the same as the space and, provided the cutting action is made rapid enough, will depend wholly upon the width of the space primarily left by withdrawal of the shim from the space between the stop and pattern. Said shim or insert is preferably pivotally attached to the face of the sleeve constituting the stop, as shown in Fig. 15, for convenience of use in the primary adjustment and withdrawal.

In the construction so far described the gage arm is kept pressed against the side of the pattern by the action of the spring 15. This pressure may be supplemented or assisted, if desired, by the action of the spring 76 already referred to operating on the portion of the gage arm which rests on the lens-carrying shaft, through engagement with said arm of a collar 34 loose on said shaft. Obviously said spring would, under this condition, assist the action of the spring 15 in moving the cutter shaft axially when the gage meets a depressed portion of the pattern or lens face. Said spring 76 and attachments may be omitted, however, if desired, and the gage arm may be held without using a weight 31 and extension of said gage arm or similar device by employing the construction illustrated in Fig. 16. In this modification the said gage is shown held against either up or down movement by the use of a thin, upright, flexible rod 35 immovably supported at one end and attached at its other end to the arm 12. Said rod may have a spring bias tending to hold the gage arm against the side of the lens or pattern.

Instead of constructing the frame or support for the cutter so that it may swing the cutter to keep it engaged with the changing periphery of lens, the lens-holding shaft may be supported in a movable spring-operated frame and the cutter be mounted in a fixed frame. Likewise the gage arm instead of being carried by the cutter frame may be mounted on a fixed support and the axial adjustment of the lens and the cutter with respect to one another be brought about by mounting the lens-carrying shaft so that it shall be capable of axial movement adjusted or controlled by the gage arm. This modification of my invention is illustrated in Figs. 9 and 10. In this case are frame 7' supporting the cutter and cutter shaft is fixed and the shaft 3 is also properly mounted so as to be held against axial movement and rotates in any desired form of bearing. The drive pulley 4 is likewise permanently attached to said shaft in any desired manner.

The pattern may be keyed to the shaft 18 and the lenses fixed or clamped in co-axial position with the pattern on said shaft by the means already described or by any other suitable means. The frame or uprights in which the shaft is journaled is mounted on rocker bearings as indicated at 36 on the base plate and as clearly indicated in Fig. 9. This permits the lens-carrying shaft to move in a direction toward and away from the edge of the fixed cutter while the cutter engages the varying peripheral outline of the lens, the cutting edge being kept in yielding engagement by the operation of springs 9' properly applied to the rocking frame in which the lens-carrying shaft is mounted. The shaft itself, instead of being held in its bearing 27 so as to be prevented from moving axially, is adapted to slide axially in its bearing 27 and any others provided for it.

A suitable spring 37 applied between the bearing 27 and the inner one of the pair of chuck heads at the left of the machine tends to move said shaft to the left under the positive control of a fixed gage arm 12' which engages the pattern and permits said movement only as the said gage arm passes on to a lower surface on the side of the pattern or lens. Movement of said shaft to the right is produced against the action of said spring as a higher surface on the side of the pattern or lens passes the rigid gage arm. The spring 37 is made sufficiently strong when acting in conjunction with chuck spring 24 to overbalance the chuck spring 24' located at the left-hand end of the shaft, and which, in the particular construction shown, would tend to move said shaft in a direction opposed to the direction of action of the spring 37. The gage arm itself is suitably mounted on a bearing on the base and is operated by an adjusting screw 38 or is otherwise suitably mounted and adjusted to be held rigidly in position and to be capable of adjustment into engagement with the coöperating surface on the side of the pattern or lens.

In operating the machine the pattern required or adapted to the form of lens or lenses to be grooved is keyed to the shaft 18 and clamped in position thereon by the devices already described. The lenses are placed in the chucks, the spring-actuated members of which are drawn back sufficiently for that purpose and are adjusted circumferentially to a corresponding position between the clutch or chuck members as indicated in Fig. 3, so that the line of cut required in the edge of the lens will be parallel throughout to the changing surface line on the side of the pattern which is engaged by the gage arm. The cutter shaft is then moved axially and the cutter edge brought to position at the proper point on the edge of the lens between the two faces, and, the collar or collars 14 having been loosened on the shaft, the gage arm itself is at the same time brought up into firm engagement with the gage surface of the pattern and then is fixed in immovable axial relation to the shaft and cutter by fastening the collars 14 to the shaft by setting set screws provided.

The depth gage 32 is then moved up against the edge of the pattern with the shim plate or insert 33 interposed and the depth gage 32 is then fixed on the gage arm by the set screw. The shim or insert 33 is then swung out of the space between the gage 32 and the edge of the pattern 17 by swinging on the screw by which it is attached to the gage 32 as shown in Fig. 15. This adjustment of the gage 32 effects the adjustment for the depth of cut of the groove. Obviously, however, the same adjustment and operation for depth of cut may be made by properly locating the gage 32 so that, instead of engaging a pattern, it would engage the edge of the lens itself.

The adjustments described having been made, the machine is started into operation and continued until the groove has been cut all the way around the lens completely and to the desired depth. The relative speeds of operation or rotation of the lens and cutter may be varied but under ordinary operations the lens should rotate at a very much slower speed than the cutter. Obviously, also, the lens may be caused to turn more than once for the completion of the cutting of the groove to the desired depth and the action of the depth gage described will be obviously the same in such case as it would be if the relative speeds of movement and the abrasive action of the cutter were sufficient to cut the groove to the desired depth in one traverse of the cutter around the periphery of the lens.

In the action of the machine it is plain that the axial position of the cutter required for proper location of the groove is positively determined by the rigid axial relation of the same to the gage arm and by the fact that the said gage arm in its movement parallel to the axis of the cutter will cause the cutter to shift axially in exact correspondence with its own movements under the control of the pattern or the sides or face of lens with which it may be engaged.

The machine shown in Fig. 9 is employed in substantially the same manner. The required pattern and lenses having been fixed co-axially on the shaft 18, the gage arm 12' is brought up against the face of the pattern 17 and by adjustment of the screws 38 the shaft is moved axially until the lenses are brought into proper relation at their edges to the edge of the cutters. The machine is then started into operation, after which the automatic axial shifting of the shaft 18 under the control of the gage arm will keep the edge of the cutter at the required distance from one or both faces of the lens of whatever form the same may be. The depth gage 32 obviously could be employed in the same manner as in the case of the machine shown in Figs. 1, 2 and 3 and may be mounted upon the cutter shaft or frame in the manner shown in said figures or in any other suitable manner. In this instance the projection of the arm carrying it, which projection or extension operates as the gage arm of the apparatus, would be removed, the function of such gage arm being in such case performed by the fixed gage arm 12'.

While I have described the gage for gaging the depth of cutting and producing a uniform depth of cut all the way around as being mounted on the member of the machine consisting of the rotary cutter and movable frame therefor and as coöperating with the pattern to fix the depth of cut, it will be obvious that the said gage arm for gaging the depth of cut might be mounted upon the other member, namely that which rotates the lens or be otherwise mounted without departing from my invention.

It is obvious that by the use of my invention and by employing a pattern the lens may be grooved at its edge with the groove at any position with respect to the faces or, in other words, at any distance therefrom at any point in the periphery. The groove, in other words, may describe a line which is the same distance from one face all the way around and vary in distance from the other face, or it may be at different distances from the two faces around the whole periphery. Also, where the lens varies in thickness, the groove may describe a medial line all the way around or a line lying to one side or the other of a medial line but parallel to such medial line or varying therefrom as desired.

To insure an absolute fit of the grooved lens to a given size of frame, an additional size-plate or pattern having the same peripheral contour as the lens to be grooved and having a groove of the required depth in its edge may be provided for insertion in the lens-holder. When the same has been properly located the cutting wheel may be set in the groove of said additional pattern so that it will rest in the bottom of the groove and the depth gage consisting of the collar 32, which in such instance need not have the insert 33 upon it, is then set against the edge of the pattern 17 of the same contour as the pattern inserted in the lens-holder. The lens to be grooved is then substituted for said grooved pattern and the wheel or cutter will then cut exactly the distance required into the lens when the machine is started into operation. Said additional or supplemental lens pattern is illustrated in the drawings, Figs. 17 and 18, in side and edge view respectively.

The specific form of my invention illustrated in Figs. 9 and 10 is not herein claimed but is claimed specifically in an application for patent filed by me as a division of the present application.

What I claim as my invention is:—

1. In a machine for cutting grooves in the edge of lenses, the combination substantially as described, of a rotating cutter and a rotating lens-holder rotating on parallel axes and one of which is axially adjustable to determine the position of the edge of the cutter with respect to the faces of the lens, means for holding the cutter yieldingly engaged with the edge of the lens as the latter rotates and means operatively connected by direct positive mechanical connection with the axially adjustable member to move the same positively in both directions and acting automatically to keep the edge of the cutter at the desired distance from the face or faces of the rotating lens around the whole periphery thereof.

2. In a machine for cutting grooves in the edge of lenses, the combination of a rotary cutter shaft and a rotary lens carrying shaft axially adjustable one with respect to the other to determine the position of the groove, gaging means one element of which is positively connected to one of said shafts by means maintaining a fixed axial relation of said shaft and element with relation to one another so that neither may move without communicating movement positively to the other and coöperating devices for controlling the axial adjustment in accordance with the conformation of the face of the lens being grooved.

3. In a machine for grooving the edge of lenses, the combination substantially as described, of a rotary cutter and a rotary lens-holder axially movable one with respect to the other to determine the position of the groove with respect to the faces of the lens, means for holding the cutter edge yieldingly engaged with the lens edge during rotation of the lens and means for adjusting the axially movable member to determine the position of the groove in respect to the lens faces, said means comprising a gage arm and a pattern rotating with the lens, one of which is operatively connected with said axially movable member to adjust its position in accordance with the changing surface of the face of said rotating pattern.

4. In a machine for grooving the edge of lenses, the combination substantially as described, of a rotary cutter and a rotary lens-holder axially movable one with respect to the other to determine the position of the groove with respect to the faces of the lens, a spring acting to move one of said members axially in one direction and means operatively connected with said member by devices maintaining an immovable relation thereof to said member in an axial direction and means coöperating therewith throughout the whole grooving operation and in accordance with changes in the formation of the face of the lens to positively move said member against the action of the spring in one direction and to positively restrain or control its movement by the influence of the spring in the opposite direction.

5. In a machine for cutting grooves in the edge of lenses, the combination substantially as described, of a rotary cutter shaft and a rotary lens-holding shaft one of which is axially movable to determine the position of the groove cut in the edge of the lens with respect to the faces thereof, a pattern rotating with the lens and a gage arm connected to said axially movable member and continually engaging the face of said pattern for determining the axial position of the said axially movable member as and for the purpose described.

6. In a machine for cutting a groove in the edge of a lens of finished peripheral contour, the combination with a rotating cutter mounted in a frame movable toward the edge of the lens, of means connected with said frame to keep the cutter in yielding engagement with the edge of the lens and means coöperating with said frame in all positions thereof to automatically stop the movement thereof with relation to the edge of the lens when the cutter edge has entered the lens to the required depth below the finished periphery thereof as and for the purpose described.

7. In a machine for cutting a groove in the edge of a lens of finished peripheral contour, the combination of a rotary cutter mounted on an axis in a movable frame movable to and from the lens, a rotary lens-holding chuck, a lens pattern having the same peripheral contour as the lens being grooved and mounted co-axially with the lens and rotating therewith and means connected with the cutter frame and coöperating with the edge of said pattern to regulate the depth of cut by engaging the edge of the pattern when the edge of the cutter has moved to the desired distance within the finished contour edge of the lens being grooved.

8. In a machine for cutting a groove in the edge of a lens, the combination of a rotary cutter mounted on a frame yieldingly pressed toward the edge of the lens to cut a groove therein, means for rotating the lens, a lens pattern or templet mounted co-axially with the lens and rotating therewith, an adjustable stop carried by the cutter frame and adapted to engage the edge of the pattern to limit the depth of cut and means carried by said stop adapted for insertion between the stop and edge of the pattern to adjust the action of the machine to the depth of groove desired.

9. In a machine for cutting a groove in the edge of a lens, the combination of a rotary lens carrying shaft and a rotary cutter shaft axially adjustable one with respect to the other, means for holding the cutter and lens in yielding engagement, a pattern rotating with one of said shafts, a gage bearing against the face of the pattern to determine the position of the groove with respect to the faces of the lens and means engaging the edge of the pattern to limit the depth of groove.

10. In a machine for cutting grooves in the edge of lenses, the combination of a rotating axially adjustable cutter, a rotating lens-holding chuck, means for retaining the cutter in engagement with the edge of the lens, a pattern rotating synchronously with said lens and formed in accordance with the required position of the cut in respect to the lens faces and a gage arm engaging said pattern and operatively connected with the cutter to determine the position of the same axially.

11. In a machine for cutting grooves in the edge of lenses, the combination of a rotary axially adjustable cutter, a rotary lens-holder, a spring acting on the cutter and tending continually to move the same in one direction and a gage positively connected to the cutter and adapted to move it in the opposite direction against the force of the spring, and a pattern rotating synchronously with the lens whereby the axial position of the cutter may be adjusted to conform to the variation in the line of the groove made necessary in order that said groove may be at a uniform distance from one face of the lens all the way around or may describe a medial line with respect to both faces when the said lens varies in thickness around its periphery.

12. In a machine for cutting grooves in the edge of lenses, the combination of a rotary cutter adapted to cut a groove in the edge of the lens, a rotary lens-holding chuck, means for holding the cutter and the edge of the lens yieldingly engaged with one another during rotation of both, an axially movable shaft to which the cutter is fixed, a spring operating on said shaft in one direction and tending continually to move the shaft and cutter axially, means independent of said spring for securing the cutter to the shaft, a gage arm sleeved on the shaft, means on said shaft for holding said gage arm sleeve in immovable relation with respect to the shaft in an axial direction whereby movement of the arm in a direction opposed to the action of the spring will positively move the shaft, and means for moving said arm automatically in obedience to changes in the position of the line of cut required in order that the same may be at a uniform distance from both faces of the lens all the way around the periphery thereof.

13. In a machine for cutting grooves in the edge of lenses, the combination of an axially movable rotary cutter, a rotary lens-holder for rotating the lens during rotation of the cutter and a gage arm operatively connected with the cutter shaft independently of lens-holder and holding said gage arm in fixed relation to the shaft in either direction axially so as to move the shaft and cutter positively and automatically in either direction in accordance with changes in the conformation of the face of the lens near its edge.

14. In a machine for cutting grooves in the edge of lenses, the combination substantially as described, of an axially adjustable rotary cutter shaft, a plurality of cutters secured thereto, a rotary lens-carrying shaft provided with a plurality of lens-holding chucks each adapted for operation with one of said cutters in grooving the edge of a lens, a pattern mounted on said lens-holder shaft and a gage engaging the pattern and operatively connected with the axially movable cutter shaft to adjust the position of the cutter with respect to the faces of the lens being grooved by positively moving the cutter shaft and cutters in one direction against the influence of a spring and by allowing a restrained and regulated movement thereof in the opposite direction and under the action of the spring.

15. In a machine for cutting grooves in the edge of lenses, the combination of a rotary cutter shaft having a cutter fixed to said shaft and a rotary lens-carrying shaft one of which shafts is axially movable, means for holding the cutter and edge of the lens yieldingly engaged with one another during rotation of both, a spring operating directly on the axially movable shaft to move the same in one direction axially and means fixed upon said shaft in immovable axial relation thereto for moving the same in the opposite direction against the influence of the spring and conformably to the changing form of the face of the lens.

16. In a machine for cutting grooves in the edge of lenses, the combination of a rotary cutter shaft having a cutter fixed thereto, a coöperative rotary lens-holding shaft, a spring tending to move the cutter shaft and cutter in one direction and a gage arm sleeved on the shaft and held in fixed axial position with relation to the shaft by two collars or abutments fixed to the shaft, whereby a movement of the gage arm will cause the cutter to move axially in either direction by positive action of the arm and means coöperating with said arm to maintain automatically the desired axial relation of the said shafts.

17. In a machine for grooving the edge of lenses, the combination substantially as described, of a lens-carrying shaft and a cutter shaft, a grooving cutter on said shaft, means for holding the cutter edge and the edge of the lens yieldingly engaged with one another and means for limiting the depth of groove cut thereby comprising a stop or gage carried by one of said shaft members and adapted to engage a contour pattern having the same contour as the extreme permanent contour of the lens being grooved and operating to limit the approach of cutter and lens throughout the whole cutting of the peripheral groove, said gage being adjustable as described to determine the movement of the member to which it is attached whereby a lens of different size but of the same contour may be cut with a groove of the desired depth without change of the contour with which the gage directly coöperates.

18. In a machine for grooving the edge of lenses, the combination substantially as described, of a lens-carrying shaft and cutter and a cutter shaft, means for yieldingly holding the cutter and lens edge in engagement, a stop carried by the cutter shaft and adjustable to and from the axis of the lens-carrier, a revolving element revolving with the lens-carrying shaft and having a contour edge the same as that of the lens, and a shim or insert mounted on said stop and gaged to the required depth of groove and movable into and out of position between the gage and the edge of said revolving element.

19. In a machine for grooving the edge of lenses, the combination substantially as described, of two rotating shafts one carrying a cutter and the other mounted parallel therewith and provided with means for co-axially mounting a lens and a pattern and means connected with the cutter in immovable axial relation therewith and adapted to engage a face of the pattern to control the relation of the lens-carrier and cutter-carrier shafts in an axial direction.

20. In a machine for cutting a groove in the edge of a lens, the combination substantially as described, of a rotary shaft carrying a lens, a cutter frame carrying a rotary cutter rotating on an axis parallel to the axis of rotation of the lens and yieldingly pressed against the edge of the lens, a pattern mounted co-axially with the lens and rotating therewith, and an adjustable depth gage connected with the cutter frame and engaging the edge of said pattern to limit the movement of the cutter frame whereby, on insertion of a grooved lens pattern in place of a lens, the gage may be set at the exact point necessary to produce a uniform groove of the required depth.

21. In a machine for cutting a groove in the edge of a lens, the combination substantially as described, of a cutter frame carrying a rotary cutter and yieldingly pressed toward the edge of the lens, a cutter mounted on said frame and axially movable thereon, a rotary shaft carrying a lens, a pattern mounted co-axially with the lens and rotating therewith, a gage arm positively connected with the axially movable cutter and adapted to engage the face of the pattern to determine the position of the groove cut in the edge of the lens with respect to the faces thereof and carrying a member adapted to provide adjustable engagement with the edge of the pattern to operate as a depth gage whereby, on insertion of a grooved lens pattern in the lens clamp, and bringing the cutter into engagement therewith, the apparatus may be adjusted to produce the desired depth of cut.

Signed at New York, in the county of New York and State of New York, this 27th day of August, A. D. 1915.

FRANK B. MARCHANT.

Witnesses:
F. B. TOWNSEND,
REMINGTON SCOTT.